United States Patent
Murase

[19]

[11] Patent Number: 6,108,302
[45] Date of Patent: Aug. 22, 2000

[54] UPC UNIT AND UPC CONTROLLING METHOD

[75] Inventor: Tutomu Murase, Tokyo, Japan

[73] Assignee: NEC Corporation, Tokyo, Japan

[21] Appl. No.: 08/814,192

[22] Filed: Mar. 10, 1997

[30]    Foreign Application Priority Data

Aug. 22, 1996  [JP]  Japan ..................... 8-221235

[51] Int. Cl.[7] .............................................. H04L 12/48
[52] U.S. Cl. ........................................ 370/230; 370/232
[58] Field of Search ................... 370/229–236, 370/252, 293, 395

[56]         References Cited

U.S. PATENT DOCUMENTS 5,784,358  7/1998  Smith et al. ........................ 370/230

OTHER PUBLICATIONS

Jing–Fei Ren et al., "Design and Analysis of a Credit–Based Controller for Congestion Control in B–ISDN/ATM Networks", INFOCOM '95, Fourteenth Annual Joint Conference of the IEEE Computer and Communications Societies, pp. 40–48, Apr. 1995.

ATM Forum Traffic Management Specification Version 4.0 Apr. 1996; pp. 31,103–108, Letter Ballot, S.S. Sathaye.

*Primary Examiner*—Melvin Marcelo

[57]           ABSTRACT

A UPC unit 1 includes a congestion detecting circuit 4 for detecting a congesting status of a network 3 from a flow of cells in the backward direction and calculating or determining a parameter required for UPC based on the congestion status, a rewritable parameter memory 5 for storing the parameter, and a DGCRA circuit 6 for checking a conformance of cells in the forward direction on the basis of the information of the parameter memory 5 and the specified information.

20 Claims, 1 Drawing Sheet

UPC UNIT AND UPC CONTROLLING METHOD

BACKGROUND OF THE INVENTION

The present invention relates to a communications network of a packet switching system, and more particularly to technology of a UPC unit which is subject to a feedback limitation such as an ABR traffic.

As regulated in Shirish S. Sathaye, "The ATM Forum Traffic Management Specification Version 4.0", ATM Forum/95-0013R13, April, 1996 (TM4.0), the ABR service used in the ATM network is executed to report an allowable cell rate (ACR) from the network to a terminal so that the terminal can send out data at the ACR or lower rate. In general, the network for supporting the ABR service is operated to report a smaller ACR to the terminal if a traffic congestion takes place in the network or a larger ACR to the terminal if the traffic congestion does not take place. This is because the reduction of the traffic flown to the network leads to overcoming the congestion if the network is in congestion or the network may accept more traffics if the network is not in congestion.

The traffic direction from the network to the terminal is called a backward. The traffic direction from the terminal to the network is called a forward. The network operates to monitor the forward traffic for checking if the rate is the ACR or lower. If the traffic at the ACR or more is sent to the network, the network is executed to impose a penalty on the traffic of the ACR or more (non-conformance cell) at the network gate. The penalty contains an action of lowering a priority of the non-conformance cell or abandoning the cell itself.

This traffic monitoring and penalty handling are called a conformance check as described in TM 4.0. This conformance check is executed at the inlet of the unit called a UPC (simply called a UPC unit) based on the proper traffic parameter. Some of the UPC units treat a CBR or VBR. Herein, the description has been concerned with the UPC unit for treating the ABR. The traffic is abandoned if the nonconformance cell is sent out, so the terminal cannot keep the communications quality. To avoid this, the terminal tries to keep the ACR.

On the other hand, the network guarantees the regulated communications quality against the traffic at the ACR or lower (conformance cell) in the forward direction. The terminals termed herein contain a general terminal of an information source, a VSVD regulated in TM 4.0, and the other general sources viewed from the network such as a router and a LAN, which are all called a terminal. If the information source belongs to a network promoted by another mother body, the UPC function is called NPC. Since the NPC is substantially identical to the UPC, herein, the NPC and the UPC are both called a UPC or UPC's.

The ACR in the backward from the network to the terminal is temporarily stored in the UPC when the ACR passes through the UPC. The stored ACR reaches the terminal, where the ACR is effective as a monitoring rate for the UPC on the timing when the data reaches the UPC. The time taken in the process of UPC's receipt of the new ACR, passage of the ACR to the terminal, and arrival of the data at the ACR from the terminal to the UPC through the network is called $\tau_2$. For example, it is assumed that the reciprocation of data between the UPC and the terminal has a delay of 2 msec, the ACR of the UPC is set as 10 Mbps, and the traffic sent from the terminal is monitored if it is 10 Mbps or lower. When receiving the new ACR=5 Mbps from the network, the UPC operates to set the ACR as 5 Mbps 2 msec later than the receipt and then monitor if the traffic from the terminal is 5 Mbps or lower.

In actual, however, the delay between the UPC and the terminal is not always constant. It may be a statistical queuing delay. For example, it is assumed that the statistical delay minimum is $\tau_3$ and the maximum is $\tau_5$. The adoption of $\tau_5$ as $\tau_2$ permits the UPC to let the nonconformance cell pass if the queuing delay is zero. Conversely, the adoption of $\tau_3$ as $\tau_2$ permits the UPC to erroneously treat the conformance cell if the cell suffers from the queuing delay on the way to the UPC.

The foregoing conventional UPC unit has a constant value of $\tau_2$ set independently of the congestion. If $\tau_2$ takes a large value, therefore, the UPC unit lets the nonconformance cell pass to the network if the network is in congestion, thereby increasing the congestion and lowering the communications quality. Conversely, if $\tau_2$ takes a small value, the UPC unit lets even the doubtful cells be forcibly abandoned if the network is in congestion, thereby lowering the communication quality.

SUMMARY OF THE INVENTION

It is an object of the present invention to provide a UPC unit and a method for controlling data through a UPC which enable to solve the foregoing problems.

It is another object of the present invention to provide a UPC unit and a method for controlling data through a UPC which are arranged to prevent improper traffic flown to a network if the network is in congestion or prevent erroneous abandonment of doubtful cells if the network is not in congestion.

The objects of the present invention are achieved by a UPC unit for controlling a traffic that is subject to feedback control, which comprises: congestion detecting means for detecting a congesting status of a network on flow of cells in backward direction and calculating parameters for UPC based on the detected congestion status; a rewritable parameter memory for storing the parameters; and checking means for checking a conformance of cells in forward direction based on information of the parameter memory and traffic information.

The objects of the present invention are achieved by a method for controlling a traffic that is subject to feedback control for a UPC, which comprises the steps of: detecting a congesting status of a network from the flow of cells in backward direction and calculating a parameter for UPC control based on the detected congesting status; and checking a conformance of cells coming to a UPC unit in forward direction, based on the calculated parameter.

According to an aspect of the invention, the UPC unit enables to grasp the congesting status of the network and adjust the value of $\tau_2$ according to the congesting status. If the network is in congestion, the UPC unit operates to prevent improper inflow of a traffic to the network by inhibiting as many non-conformance cells as possible. Conversely, if the network is in congestion, the UPC unit operates to prevent erroneous abandonment of doubtful cells to the network by flowing the doubtful cells to the network.

It is preferable that the means for checking a conformance of cells utilizes the algorithm A contained in the DGCRA algorithm regulated in the appendix of TM 4.0.

The parameter is 2, which indicates a timing on which the data sent at the ACR from the terminal reaches the UPC.

The congestion detecting circuit operates to extract ER (Explicit Rate) information from a BRM (Background Resource Management) cell. If the new ER value is lower than the immediately previous ER value, the congestion detecting circuit operates to lower $\tau_2$ by a decrement. If the lowered result is smaller than the minimum value $\tau_3$, $\tau_2$ is replaced with $\tau_3$. Conversely, if the new ER value is the same or greater than the immediately previous ER value, the congestion detecting circuit operates to increase $\tau_2$ If the increased result is larger than the maximum value $\tau_5$, $\tau_2$ is replaced with $\tau_5$.

Further, the congestion detecting circuit operates to check if the operation regulations of the sending terminal regulated in TM 4.0 can trigger the action of decreasing or increasing the ACR. If the checking result reveals the change of the ACR, the new ACR is assumed as the extracted ER and is used for defining the value of $\tau_2$.

BRIEF DESCRIPTION OF THE DRAWINGS

This and other objects, features and adavantages of the present invention will become more apparent upon a reading of the following detailed description and drawings, in which.

DESCRIPTION OF THE EMBODIMENTS

Figure 1:
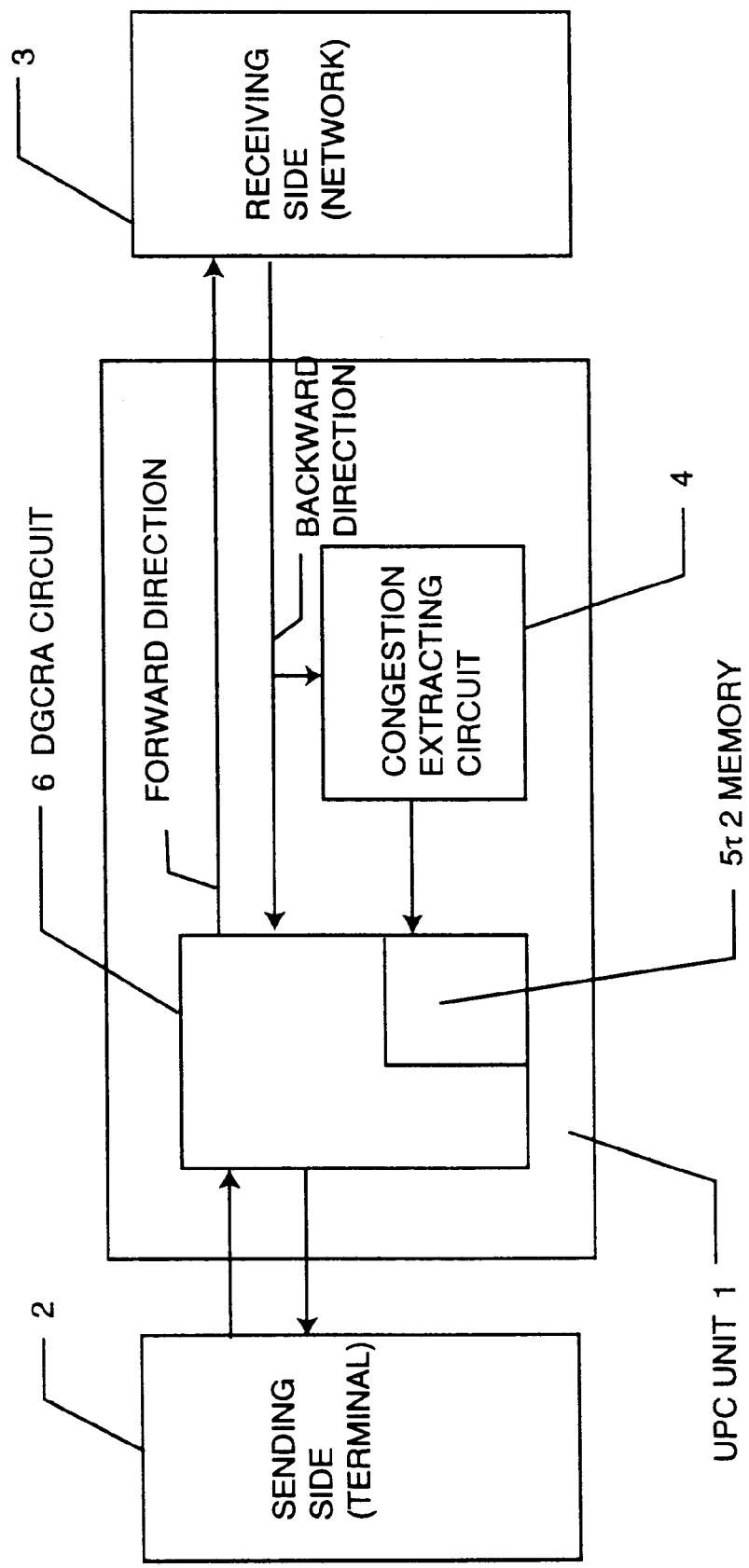
FIG. 1 is a block diagram showing a UPC unit according to an embodiment of the present invention.

The present invention will be described along the embodiments with reference to the appended drawing.

FIG. 1 is a block diagram showing a UPC unit according to an embodiment of the present invention.

The present adaptive control UPC unit is installed in an UNI (User Network Interface) provided in a packet switching network as described in TM 4.0. If it is used as an NPC, it is installed in the NNI.

As shown in FIG. 1, the UPC unit according to this embodiment is arranged to control the traffic that is subject to the feedback control like the ABR traffic as described in TM 4.0. The UPC is connected to a sending terminal 2 and a network 3 and includes a congestion detecting circuit 4, a parameter memory 5, and a DGCRA circuit 6. The congestion detecting circuit 4 operates to detect the congesting status of the network from the flow of cells in the backward direction and calculate or define parameters required for UPC control based on the detected congestion status. The parameter memory 5 is rewritable and stores the parameters. The DGCRA circuit 6 operates to perform a conformance check for the cells coming to the UPC unit in the forward direction by using the information stored in the parameter memory 5 and the specified information.

Herein, the congesting status means a status presumed from the value standing for the congesting information of the network such as ER, CI, and NI of a RM cell in the backward. When the arrival interval of the RM cells is long, the network is likely to be in congestion, while when the arrival interval is short, the network is less likely to be in congestion. The arrival pattern of the RM cells may be a basis on which the congesting status is determined.

The determined or presumed congesting status is used for determining part of a parameter required for UPC control. Herein, the part of the required parameter means such parameters such as $\tau_2$ as changeable according to the congesting status of the network for improving the communications quality.

The DGCRA circuit 6 operates to monitor the traffic from the terminal 2 to the network 3 on the traffic parameters and detect or extract the congesting information and the rate control information such as an arrival pattern or a cell type coming from the terminal 2 to the network 3 from the traffic or the cell payload. Further, the network congestion extracting circuit 4 operates to determine a parameter of $\tau_2$ from the congesting information and the rate control information and write it to a $\tau_2$ memory 5. The parameter $\tau_2$ is part of the regulated traffic parameters. The parameters $\tau_2$ accumulated in the $\tau_2$ memory 5 is changed by the network congesting detecting circuit 4.

In turn, the description will be oriented to the operation of each circuit. The DGCRA circuit 6 performs the conformance check regulated in TM 4.0. The UPC unit of this embodiment adopts an algorithm termed the algorithm A contained in the DGCRA algorithm regulated in the appendix of TM 4.0. Concretely, the DGCRA circuit 6 checks the cells coming from the sending terminal 2 to the UPC unit 1 one by one on the basis of the algorithm. This algorithm is executed to check if it is conformance. The cell determined to be conformance is sent to the network 3 as it is. The cell determined to be non-conformance is abandoned or may be sent to the network 3 after the priority of the cell is degraded. The algorithm is executed by using the traffic parameters as specified in TM 4.0, the part of which parameters are dynamic ones and may be changed according to a time point, occurrence of an event such as arrival of cells from the terminal 2 to the network 3 or from the network 3 to the terminal 2, an occurrence interval, and an occurrence sequence. The TM 4.0, however, indicates that the parameter $\tau_2$ is determined when a connection is made without changing it. In the prior art, the parameter $\tau_2$ is not changed since the connection is made. In this embodiment, however, the UPC unit may define the maximum value $\tau_5$ and the minimum value $\tau_3$ and take any middle value between the maximum value $\tau_5$ and the minimal value $\tau_3$. The parameter $\tau_2$ may be any real value. In place, the set values of $\tau_2$ may be reduced in number and may be discrete values. That is, these three values may be taken such as $\tau_3$, $\tau_5$, and $\tau_4$ ($\tau_4 = (\tau_3 = \tau 5)/2$).

The network congestion detecting circuit 4 operates to extract the ER information from the BRM cell. If the newly extracted ER value is lower than the immediately previous ER value by f % or more, $\tau_2$ is made lower by a decrement (1/s). If the value of $\tau_2$ lowered by 1/s is made smaller than $\tau_3$, the ER value is taken as $\tau_3$. Conversely, if the newly extracted ER value is equal to or greater than the immediately previous ER value, the value of $\tau_2$ is increased by delta $\tau$. If the increased value is larger than $\tau_5$, the ER value is made to be $\tau_5$. In this embodiment, the delta $\tau = (\tau 5 - \tau_3)/10$. However, the delta $\tau$ may be any positive value except that or may be experimentally determined on the trial-and-error basis. In this embodiment, the newly extracted ER value is compared with the immediately previous ER. In place, it may be compared with the ER values extracted in the past. Or, the reduction of the ER value may be determined to be statistically changed by the statistical method using the past average values and discrete values without considering the minute ER value fluctuation.

Further, the network congestion extracting circuit 4 operates to check if the following status or condition is established where an action of increasing or decreasing the ACR is triggered according to the operating regulations of the sending terminal regulated in TM 4.0 such as a longtime absence of a BRM cell coming to the UPC unit. The checked result indicates the change of the ACR. If the changed ACR is made to be a new ACR, the new ACR is assumed as the extracted ER value, on which the parameter $\tau_2$ is determined by the foregoing method.

The congestion extracting circuit 4 operates to write the parameter $\tau_2$ in the $\tau_2$ memory 5 a time $\tau s$ later than the start of the process for determining the parameter $\tau_2$. In this embodiment, if it is assumed that the process for determining $\tau_2$ consumes a time of $\tau 6=100$ msec, $\tau set=\tau 6$ is established. $\tau set$ may be set as any value except $\tau 6$.

The UPC operation is executed at each connection unit. Hence, this description has been oriented to one connection, In actual, the physical transmission path are shared by plural connections (cell-multiplexed), so that two or more connections may be treated by one UPC unit at a time. If two or more connections are treated at a time, the required number of the $\tau_2$ memory 5 is equal to the number of the corresponding connections and the other circuits such as the network congestion detecting circuit 4 are operated at each connection unit. The UPC unit for one connection as described above may be easily changed to the UPC unit for the network with plural connections by the persons skilled in the art.

As set forth above, according to the present invention, the UPC unit and the control method through the UPC are arranged to speed up the solving of the congestion when the network is in congestion and reliably put the doubtful cells in the network when the network is not in congestion. Hence, the arrangements are effective in keeping the communication quality of the doubtful cells constant.

The ground for the above is as follows. When the network is in congestion, the traffic of the non-conformance cells that are not necessary and have an adverse effect on the network is inhibited to be flown into the network, thereby speeding up the solving of the congestion. In this case, the doubtful cells may be abandoned. However, if the doubtful cells are allowed to be flown in the network, they are more likely to be abandoned in the network when the network is in congestion. Hence, the UPC unit operates to abandon the doubtful cells in advance, thereby lowering the load of the network and effectively solving the congestion of the network. On the other hand, when the network is not in congestion, the traffic of the non-conformance cells may be flown into the network. If so, the traffic of the nonconformance cells is less likely to lower the communications quality of the network. Further, when the network is not in congestion, the doubtful cells are allowed to be positively put in the network, which does not lead to lowering the communications quality of the doubtful cells.

The entire disclosure of Japanese Patent Application No. 8-221235 filed on Aug. 22, 1996 including specification, claims, drawing and summary are incorporated herein by reference in its entirety.

What is claimed is:

1. A UPC unit for controlling a traffic that is subject to feedback control, said UPC unit comprising:
   congestion detecting means for detecting a congesting status of a network on flow of cells in backward direction and calculating parameters for UPC based on said detected congestion status;
   a rewritable parameter memory for storing said parameters; and
   checking means for checking a conformance of cells in forward direction based on information of only said parameter memory and traffic information.

2. The UPC unit of claim 1, wherein a traffic service is an ABR service.

3. The UPC unit of claim 1, wherein said checking means comprises means for checking a conformance of cells based on an algorithm A contained in the DGCRA algorithm regulated in Appendix of TM 4.0.

4. The UPC unit of claim 1, wherein said parameter indicates a time taken in passage of data at a new allowable cell rate from a terminal to said UPC unit after said UPC unit receives said new allowable cell rate.

5. The UPC unit of claim 4, wherein said congestion detecting means comprises means for increasing a parameter by a decrement when the explicit rate information newly extracted from a backward resource management cell is lower than the immediately previous explicit rate value and for increasing said parameter by an increment when the explicit rate information newly extracted from the backward resource management cell is the same as or greater than the immediately previous explicit rate value.

6. The UPC unit of claim 5, wherein said means for increasing a parameter by a decrement or an increment comprises means for setting said parameter to a predetermined minimum value Min when said parameter increased by a decrement is smaller than said predetermined minimum value Min and for setting said parameter to a predetermined maximum value Max when said parameter increased by an increment is larger than said maximum value Max.

7. The UPC unit of claim 4, wherein said congestion detecting means comprises means for checking when the status is a triggering action of decreasing/increasing the allowable cell rate specified in the operation regulations of the sending terminal regulated in TM 4.0, setting the new allowable cell rate to said extracted explicit rate when it is determined that the allowable cell rate is to be changed on the checking result, and determining said parameter on said new allowable cell rate.

8. The UPC unit of claim 4, wherein said congestion detecting means comprises means for increasing/decreasing said parameter based on an arrival pattern of said resource management cells.

9. The UPC unit dedicated to controlling an ABR traffic, comprising:
   congestion detecting means for detecting a congesting status of a network based on flow of cells in backward direction and changing a time $\tau_2$ taken in passage of data at a new allowable cell rate through the network from a terminal to a UPC unit after said UPC unit receives said new allowable cell rate;
   a rewritable parameter memory for storing said $\tau_2$; and
   DGCRA means for checking a conformance of cells in forward direction based on said $\tau_2$ information.

10. The UPC unit of claim 9, wherein said congestion detecting means comprises changing means for extracting explicit rate from a backward resource management cell, for decreasing a $\tau_2$ when said extracted explicit rate is lower than an immediately previous extracted explicit, and for increasing said $\tau_2$ when said extracted explicit rate is the same as or greater than said immediately previous extracted explicit rate.

11. The UPC unit of claim 10, wherein said changing means comprises means for setting said $\tau_2$ to a predetermined minimum value Min when said lowered $\tau_2$ is smaller than said minimum value Min and for setting said $\tau_2$ to a predetermined maximum value Max when said increased $\tau_2$ is greater than said maximum value Max.

12. The UPC unit of claim 10, wherein said congestion detecting means comprises means for checking when the status is a triggering action of decreasing/increasing an allowable cell rate specified by the operating regulations of the sending terminal regulated in TM 4.0, a said new allowable cell rate to said extracted explicit rate, and changing said $\tau_2$ on said new allowable cell rate based on said checking result.

13. The UPC unit of claim 10, wherein said congestion detecting means comprises means for changing said $\tau_2$ based on an arrival pattern of resource management cells.

14. A UPC controlling method for controlling a traffic that is subject to feedback control for a UPC, comprising the steps of:

detecting a congesting status of a network from the flow of cells in backward direction and calculating a parameter for UPC control based on said detected congesting status; and checking a conformance of cells coming to a UPC unit in forward direction based on only said calculated parameter.

15. The UPC controlling method of claim 14, wherein a traffic service is an ABR service, and said parameter indicates a time $\tau_2$ taken in passage of data at a new allowable cell rate from a terminal to a UPC through a network after said UPC receives said new allowable cell rate.

16. The UPC controlling method of claim 14, wherein at said checking step comprises a step of checking a conformance of cells based on an algorithm A contained in a DGCRA algorithm regulated in Appendix of TM 4.0.

17. The UPC controlling method of claim 14, wherein said checking step comprises a step of extracting the explicit rate information from a backward resource management cell, decreasing said parameter when said explicit rate value is lower than the immediately extracted explicit rate value, and increasing said parameter when said explicit rate is the same as or greater than the immediately previous explicit rate.

18. The UPC controlling method of claim 17, wherein said step of increasing/decreasing said parameter comprises a step of setting said parameter to a predetermined minimum value Min when said lowered parameter is smaller than said minimum value Min and setting said parameter to a predetermined maximum value Max when said increased parameter is greater than said maximum value Max.

19. The UPC controlling method of claim 14, wherein the step of detecting the congestion comprises a step of checking when the status is a triggering action of decreasing/increasing the allowable cell rate specified in the operation regulations of the sending terminal regulated in TM 4.0, when it is determined that the allowable cell rate is to be changed on said checking result, setting the new allowable cell rate to an extracted explicit rate, and determining said parameter on said new allowable cell rate.

20. The UPC controlling method of claim 14, wherein said step of detecting the congestion comprises a step of increasing/decreasing said parameter on said arrival pattern of resource management cells.

\* \* \* \* \*